(12) United States Patent
Loiseau et al.

(10) Patent No.: US 11,431,761 B2
(45) Date of Patent: Aug. 30, 2022

(54) SYSTEMS AND METHODS FOR NETWORK MANAGEMENT

(71) Applicant: OVH, Roubaix (FR)

(72) Inventors: Francois Loiseau, Tourcoing (FR); Miroslaw Piotr Klaba, Roubaix (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 16/801,041

(22) Filed: Feb. 25, 2020

(65) Prior Publication Data

US 2020/0274903 A1 Aug. 27, 2020

(30) Foreign Application Priority Data

Feb. 27, 2019 (EP) .................................... 19315009

(51) Int. Cl.
*H04L 65/102* (2022.01)
*G06F 9/54* (2006.01)
(Continued)

(52) U.S. Cl.
CPC ............ *H04L 65/102* (2013.01); *G06F 9/547* (2013.01); *H04L 9/3268* (2013.01);
(Continued)

(58) Field of Classification Search
CPC ... H04L 65/102; H04L 9/3268; H04L 9/3297; H04L 12/4641; H04L 12/66;
(Continued)

(56) References Cited

U.S. PATENT DOCUMENTS

| 8,566,452 | B1 | 10/2013 | Goodwin, III et al. |
| 8,694,993 | B1 | 4/2014 | Dotan et al. |

(Continued)

FOREIGN PATENT DOCUMENTS

| CN | 1855847 A | 11/2006 |
| CN | 201194396 Y | 2/2009 |

(Continued)

OTHER PUBLICATIONS

Abstract of Wu et al., "Authentication Mechanism for Private Cloud of Enterprise", Journal of Information Technology and Applications, 2013, pp. 52-56, retrieved on https://www.airitilibrary.com/Publication/alDetailedMesh?docid=19911424-201306-201401200009-201401200009-52-56 on Apr. 5, 2020.

(Continued)

*Primary Examiner* — Hardikkumar D Patel
(74) *Attorney, Agent, or Firm* — BCF LLP (57) ABSTRACT

Methods and systems are described for connecting to network services on a private network. A gateway device may coordinate communications between a client device on a public network and a host device on a private network. The client device may request to access the host device via the gateway device. The gateway device may authenticate the client device. The gateway device may transcode communications between the client device and the host device, thereby masking the address of the client device and the host device. The gateway device may maintain two different encryption methods between the client device and the gateway device, and the gateway device and the host device.

14 Claims, 7 Drawing Sheets

(51) Int. Cl.
  *H04L 9/32* (2006.01)
  *H04L 12/46* (2006.01)
  *H04L 12/66* (2006.01)
  *H04L 9/40* (2022.01)

(52) U.S. Cl.
  CPC ........ *H04L 9/3297* (2013.01); *H04L 12/4641* (2013.01); *H04L 12/66* (2013.01); *H04L 63/0236* (2013.01); *H04L 63/0272* (2013.01); *H04L 63/166* (2013.01)

(58) Field of Classification Search
  CPC ............. H04L 63/0236; H04L 63/0272; H04L 63/166; H04L 63/0428; H04L 63/0892; H04L 63/108; H04L 63/029; H04L 61/2582; H04L 61/2514; H04L 63/0876; H04L 63/0209; H04L 63/0823; H04L 63/10; G06F 9/547
  See application file for complete search history.

(56) References Cited

U.S. PATENT DOCUMENTS

| | | | |
|---|---|---|---|
| 8,782,414 B2 | 7/2014 | Patiejunas | |
| 8,943,570 B1 | 1/2015 | Kalbag | |
| 9,286,444 B2 | 3/2016 | Ogg et al. | |
| 10,097,523 B2 | 10/2018 | Kuker et al. | |
| 2006/0129676 A1* | 6/2006 | Modi | H04L 29/1233 709/227 |
| 2008/0077789 A1* | 3/2008 | Gondo | H04L 63/08 713/153 |
| 2013/0128892 A1* | 5/2013 | Rao | H04L 45/72 370/392 |
| 2013/0301522 A1* | 11/2013 | Krishna | H04L 61/2528 370/328 |
| 2014/0195798 A1* | 7/2014 | Brugger | H04L 63/101 713/154 |
| 2015/0326503 A1* | 11/2015 | Merchant | H04L 47/20 370/392 |
| 2015/0381567 A1* | 12/2015 | Johnson | G06F 21/105 726/12 |
| 2017/0111336 A1* | 4/2017 | Davis | H04L 63/029 |
| 2018/0034643 A1 | 2/2018 | Yang et al. | |
| 2018/0121260 A1* | 5/2018 | Nadig | G06F 16/245 |
| 2018/0295017 A1* | 10/2018 | Mao | H04L 63/0272 |

FOREIGN PATENT DOCUMENTS

| | | |
|---|---|---|
| CN | 101902400 A | 12/2010 |
| CN | 102282801 A | 12/2011 |

OTHER PUBLICATIONS

European Search Report with regard to the counterpart EP Patent Application No. 19315009.1 completed Jul. 10, 2019.
"Ericom Free SSL WebSockets Secure Gateway (ESG)", Ericom, https://www.ericom.com/securegateway.asp, accessed on Nov. 1, 2018, pdf 2 pages.
Bremner, "Five Reasons To Use Remote Desktop Gateway", 2015, http://www.castema.com/2015/05/five-reasons-to-use-remote-desktop-gateway/, accessed on Nov. 1, 2018, pdf 5 pages.
"Soliton SecureDesktop", Soliton Systems K.K., https://appadvice.com/app/soliton-securedesktop/911276638, accessed on Nov. 1, 2018, pdf 5 pages.
Kaarakainen, "Citrix Access Gateway SSL VPN-järjestelmän käyttnöönotto", Tampereen Ammattikorkeakoulu, 2007, pp. 1-116.
English Abstract for CN101902400 retrieved on Espacenet on Feb. 20, 2020.
Finn, "Connecting Users to the Azure Cloud", Microsoft Azure, https://www.petri.com/connecting-to-the-azure-cloud, 2016, accessed on Feb. 20, 2020, pdf 8 pages.
"What is the difference between SSL and SSH? Are they both just a way to safely access a remote computer through encryption? Do they also transfer data?", Quora, https://www.quora.com/What-is-the-difference-between-SSL-and-SSH-Are-they-both-just-a-way-to-safely-access-a-remote-computer-through-encryption-Do-they-also-transfer-data, accessed on Feb. 20, 2020, pdf 4 pages.
Pornin et al., "What is the difference between SSL vs SSH? Which is more secure?", StackExchange, https://security.stackexchange.com/questions/1599/what-is-the-difference-between-ssl-vs-ssh-which-is-more-secure, accessed on Feb. 20, 2020, pdf 6 pages.
Office Action and Search Report with regard to the counterpart CN Patent Application No. 202010123805.0 dated Mar. 22, 2022.
English Abstract for CN1855847 retrieved on Espacenet on Apr. 20, 2022.
English Abstract for CN102282801 retrieved on Espacenet on Apr. 20, 2022.
English Abstract for CN201194396 retrieved on Espacenet on Apr. 20, 2022.

* cited by examiner

SYSTEMS AND METHODS FOR NETWORK MANAGEMENT

CROSS-REFERENCE

The present application claims priority from European Patent Application no. 19315009.1, filed on Feb. 27, 2019, the entirety of which is incorporated by reference herein.

FIELD

Embodiments described herein relate generally to systems and methods for providing access to network services, and more particularly, to systems and methods for establishing connections between client devices on a public network and services provided by host devices on a private network.

BACKGROUND

Users may wish to access management services in a network. The services may include virtual network management services, virtual machine monitoring services, and/or any other type of service offered by a host device in a network. The user may be using a client device that is connected to the same network as the host device providing the service. For example, the client device and host device may be located in the same physical location and physically connected to the same network. In other instances, the client device might not be connected to the same network as the host device. For example, the user may wish to manage a virtual network via their mobile device while the user is traveling and connected to a mobile network or public Wi-Fi.

The services might not be accessible via public networks, such as the Internet. In order to prevent unauthorized users from gaining access to the services, the services might be restricted from connecting to devices outside of their private network. In order to access the services while connecting via the Internet, a client device may connect to a virtual private network (VPN) in order to communicate with the services. Connecting to a VPN might be cumbersome, such as because extensive configuration of the client device might be required. For this and other reasons, it may be desirable to access the services from a public network without using a VPN.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

The following summary is for illustrative purposes only, and is not intended to limit or constrain the detailed description. The following summary merely presents various described aspects in a simplified form as a prelude to the more detailed description provided below.

A gateway device may provide a portal for a client device on a public network to access a network service on a private network. The gateway device may be used to manage and/or establish a connection between the client device, which may be accessed by a user, and the host device providing the service that the user requests to access. The host device may be connected to the private network. The host device and/or the private network may be configured to prohibit devices external to the private network from accessing the host device. The client device may be connected to a public network, such as the Internet. The gateway device may be configured to communicate with both devices on the private network and devices on the public network.

The client device may transmit a request, to the gateway device, to access a service provided by the host device. The gateway device may authenticate the client device to determine whether the user is authorized to access the service. The gateway device may transmit an authentication request to an authentication device. The authentication device may transmit an indication to the gateway device indicating whether the client device has been authenticated.

After receiving an indication that the client device was successfully authenticated, the gateway device may store an address of the client device, an indication that the client device has been authenticated, and a timestamp corresponding to the authentication. The gateway device may determine an address and/or port for the client device to use when accessing the service via the gateway device. The gateway device may transmit the determined address information to the client device.

The gateway device may create a port binding between the port used by the client device to communicate with the gateway device and the port used by the host device to communicate with the gateway device. The client device may transmit data, intended for the service, to the gateway device. The gateway device may transcode the data received from the client device and transmit the transcoded data to the host device. The host device may transmit data, intended for the client device, to the gateway device. The gateway device may transcode the data received from the host device and transmit the transcoded data to the client device.

In one aspect, various implementations of the present technology may provide a method comprising receiving, at a gateway device, via a public network, and from a client device, a request to access a service provided by a host device in the private network. The gateway device may be in communication with the public network and in communication with a separate private network. The request to authenticate the client device may be transmitted to an authentication device. An indicator that the client device has been authenticated may be received from the authentication device. The gateway device may store a record. The record may comprise an address of the client device, an indication that the address of the client device has been authenticated, and/or a timestamp corresponding to the authentication. An address for communicating with the service may be transmitted to the client device. A port binding may be created between a first port used by the client device to access the gateway device and a second port used by the gateway device to access the host device. A request from the client device to access the service may be received via the external network and on the first port. Communications between the client device and the host device may be transcoded, thereby masking an address of the host device from the client device.

In the context of the present specification, unless expressly provided otherwise, a computer system may refer, but is not limited to, an "electronic device," an "operation system," a "system," a "computer-based system," a "controller unit," a "monitoring device," a "control device," a "network device," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and/or tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Implementations of the present technology each may have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

Users of client devices may wish to access various services provided by host devices connected to a private network, such as a virtual network. The client device may be connected to the same private network as the host device, in which case the client device may be able to communicate directly with the host device. The client device may be connect to the private network using a virtual private network (VPN), in which case the client device may be able to communicate directly with the host device via the VPN.

In some instances the client device might not be connected to the same private network as the host device. The client device may be connected to a public network, such as the Internet. A user of the client device may request to access a service provided by the host device via the public network.

Figure 1:
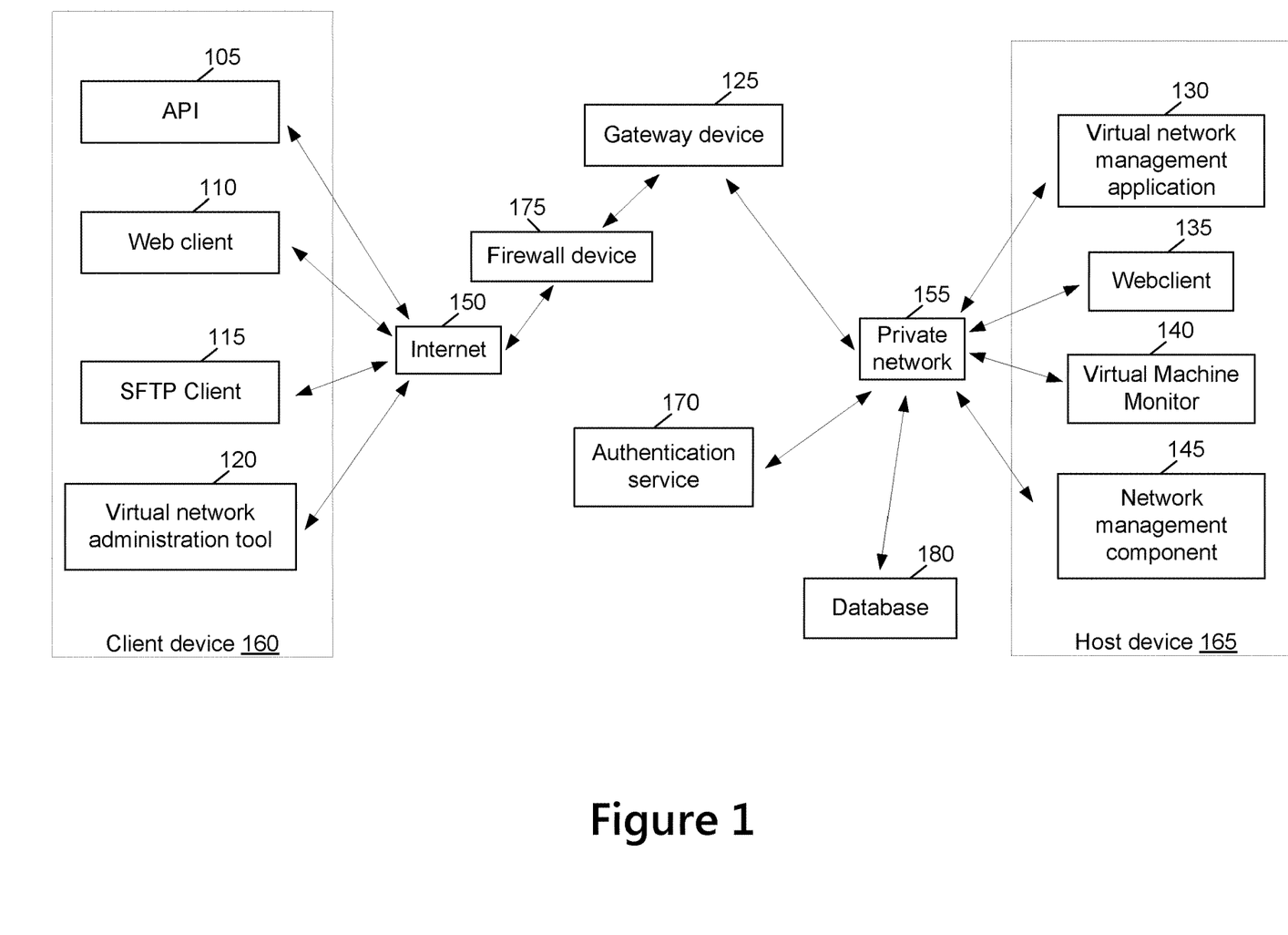
FIG. 1 shows a diagram of communications via a gateway device according to one or more illustrative aspects of the disclosure.

A gateway device may coordinate access to the service. The client device on the public network may access the service via the gateway device. FIG. 1 shows a diagram of communications via a gateway device according to one or more illustrative aspects of the disclosure. The gateway device 125 may communicate with a client device 160 via a public network, such as the Internet 150. One or more firewall devices 175 may provide a firewall between the gateway device 125 and the internet 150. The firewall device 175 may monitor traffic between the gateway device 125 and any external devices communicating with the gateway device 125 via the Internet 150. Although illustrated as a separate device, the firewall device 175 may be part of the gateway device 125. The gateway device 125 may communicate with a host device 165 on a private network 155, which may be a virtual network.

The client device 160 and/or host device 165 may be connected to any number of public and/or private networks. Although the client device 160 is illustrated as communicating directly with the Internet 150, the client device 160 may access the Internet 150 via another network, such as a private network.

The private network 155 may comprise a virtual network of host devices 165 within a data center or multiple data centers. The private network 155 may comprise host devices 165 corresponding to an organization, for example the private network 155 may comprise a plurality of web servers that are controlled by an individual business entity. Although the gateway device 125 is illustrated in FIG. 1 as being connected to the Internet 150 and a private network 155, the gateway device 125 may be connected to any number and combination of public and private networks.

The gateway device 125 may provide access to one or more services in the private network 155, such as a virtual network management application 130, a webclient 135, a virtual machine monitor 140, a network management component 145, and/or any other services. For example the services may comprise VMware virtual network services such as vCenter, ESXi, vSphere, NSX Manager etc. The services may be used to manage various aspects of the network. For example a user may access the virtual network management application 130 to configure a virtual network. The host device 165 and/or services on the private network 155 may be configured to communicate with other devices and/or services on the private network 155, but might not be configured to communicate with devices on other networks, such as the client device 160 connected to the internet 150. For security or other reasons, the host device 165 might be prevented from communicating with any devices outside of the private network 155, such as devices communicating via the Internet 150. The gateway device 125 may be able to communicate via the private network 155, and thus may communicate with the host device 165 on the private network 155. The communications between the gateway device 125 and the host device 165 may be encrypted.

The client device 160 communicating on the Internet 150 may connect to and communicate with the gateway device using any one of several interfaces. The client device 160 may communicate via an application programming interface (API) 105, a web client 110, an SSH file transfer protocol (SFTP) client 115, a virtual network administration tool 120, or any other suitable interface. The client device 160 may use the same type of interface throughout a session with the gateway device 125. For example if the client device 160 initially connects to the gateway device 125 via an SFTP client 115, the client device 160 may continue to use the SFTP client 115 to communicate with the gateway device 125 until the session is terminated between the client device 160 and the gateway device 125. The communications between the client device 160 and the gateway device 125 may be encrypted, such as by using public key encryption. The encryption method used on the Internet 150 may be different from the encryption method used on the private network 155. Because the private network is not publicly accessible and thus communications on the private network are less likely to be accessed by an unauthorized party, a less secure method of encryption may be used to communicate with the host device 165 via the private network 155 than the method of encryption that is used for communicating with the client device 160 via the Internet 150.

When the client device 160 initially connects to the gateway device 125, an authentication service 170 may be used to authenticate the client device 160. The client device 160 may transmit credentials to the gateway device 125. The credentials may comprise a username and password, a token, and/or any other credentials. The gateway device 125 may transmit the credentials corresponding to the client device 160 to the authentication service 170. The authentication service 170 may authenticate the client device 160 based on the credentials. After verifying the credentials corresponding to the client device 160, the authentication service 170 may transmit an indication to the gateway device 125 that the client device 160 has been authenticated. The authentication service 170 may communicate with the gateway device via the private network 155 and/or via any other network.

After authenticating the client device 160, the gateway device may access a database 180 to determine a port to open. The port may be determined based on the interface being used by the client device 160 and/or the service requested by the client device 160. The gateway device 125 may query the database 180 to determine the port number. The gateway device 125 may communicate with the database via the private network 155, or any other network. After determining the port number, the gateway device may transmit the port number to the client device 160. The gateway device 125 may instruct the firewall device 175 to open the port. The firewall device 175 may restrict access to the port to an address of the client device 160.

Using the gateway device 125, the client device 160 connected to the internet 150 may access services on the private network 155, regardless of whether or not the host devices 165 providing those services are configured to communicate with devices outside of the private network 155. The gateway device 125 may coordinate communications between the client device 160 on the Internet 150 and the host device 165 on the private network 155. When communicating with the client device 160 via the Internet 150, the gateway device 125 may mask the address of the host device 165 on the private network 155. The address of the host device 165 may comprise a hostname. When communicating with the host device 165 via the private network 155, the gateway device 125 may mask the address of the client device 160 on the Internet 150. The address of the client device 160 may comprise an Internet Protocol (IP) address. The database 180 may comprise one or more transcoding functions to be applied to the data to mask the addresses.

Figure 2A:
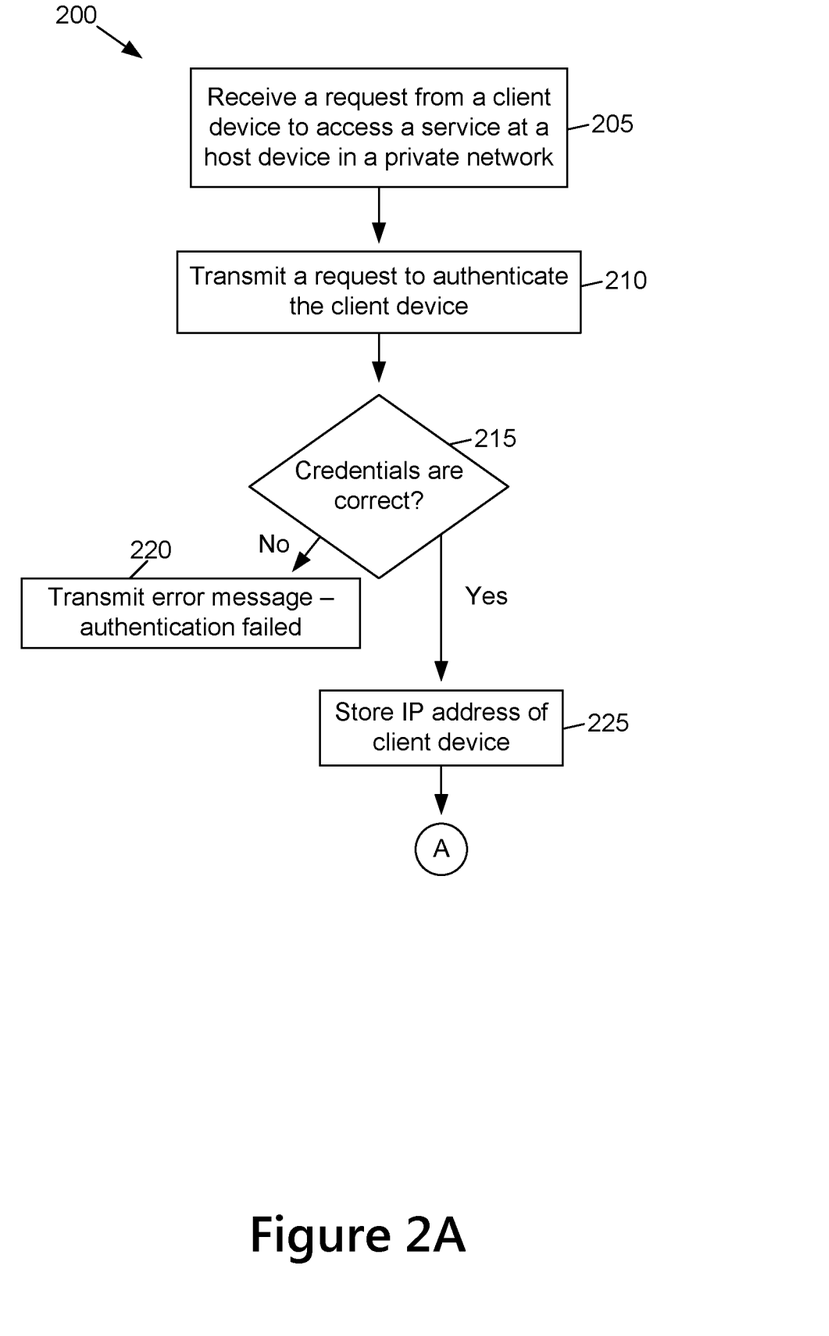
FIGS. 2A and 2B are a flow diagram of a method for accessing services via a gateway device according to one or more illustrative aspects of the disclosure.
Figure 2B:
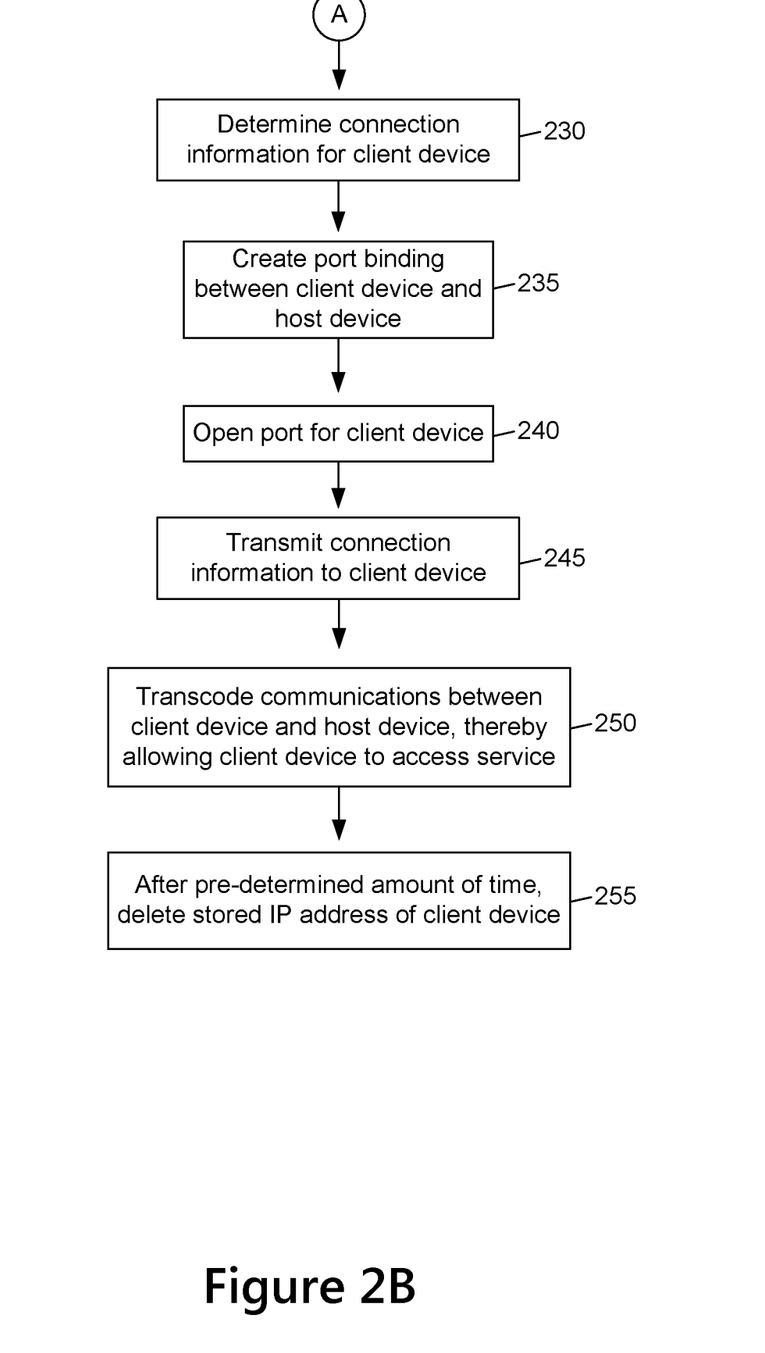

FIGS. 2A and 2B are a flow diagram of a method for accessing services via a gateway device according to one or more illustrative aspects of the disclosure. The method 200 or one or more steps thereof may be performed by one or more computing devices or entities, such as the computing environment 500 described below and in FIG. 5. Without limitation, all or portions of the method 200 may be executed on computing environments 500, such as the client device 160, gateway device 125, and/or host devices 165. The method 200 or one or more steps thereof may be embodied in computer-executable instructions that are stored in a computer-readable medium, such as a non-transitory computer-readable medium. Some steps or portions of steps in the flow diagram may be omitted or changed in order.

At step 205 a request may be received to access a service. The request may be received by the gateway device 125 via the Internet 150. The request may originate from the client device 160. The service may comprise a service provided by one or more host devices 165. The host devices 165 may communicate via the private network 155.

The gateway device 125 may receive the request at a port corresponding to the interface used to access the gateway device 125. For example if an SFTP client 115 is used by the client device 160 to access the gateway device 125, a port typically associated with SFTP may be used. The client device 160 may have been previously configured with the address and/or port for communicating with the gateway device 125.

The request may comprise an address of the client device 160, such as an IP address. The request may comprise authentication credentials corresponding to the client device 160 and/or authentication credentials corresponding to a user of the client device 160. The authentication credentials may comprise a username and password and/or any other credentials. The request may comprise an indication of which service the client device 160 is requesting to access. For example the request may indicate that the client device 160 is requesting to access the virtual network management application 130, webclient 135, virtual machine monitor 140, network management component 145, and/or any other service.

At step 210 a request may be transmitted to authenticate the client device. The gateway device 125 may transmit the request to the authentication service 170. The request may comprise the authentication credentials received from the client device 160. The request may be transitted via HTTPs and may be mapped with an Apache proxy configuration. The authentication service 170 may comprise a lightweight directory access protocol (LDAP) service, a single sign-on (SSO) service such as VMware's vCenter SSO, an active directory (AD) service, or any other suitable authentication module.

At step 215 the authentication service 170 may determine whether the authentication credentials are correct. The authentication service 170 may compare the received authentication credentials to stored credentials. The authentication service 170 may perform other functions to verify the authenticity of the received credentials, such as cryptographic functions. The authentication service 170 may transmit, to the gateway device 125, an indication of whether or not the credentials were validated. The format of the transmission from the authentication service 170 may depend on the type of authentication service 170. For example if an LDAP service is used to perform the authentication the result may be transmitted in a different format from when an SSO service is used.

If the authentication credentials fail the verification at step 215, an error message may be transmitted at step 220 to the client device 160. The error message may indicate that the authentication has failed. The gateway device 125 may transmit an indication to the client device 160 that the authentication failed.

If the authentication credentials were validated, at step 225 the gateway device 125 may store a record indicating that the client device 160 has been authenticated. The record may comprise an address of the client device 160, a timestamp corresponding to the authentication, an indication of the access level and/or privileges of the client device 160, and/or any other information corresponding to the client device 160. The record may indicate a time at which the authentication of the client device 160 expires. After that time, the client device 160 may be denied access to the host device 165 until the client device 160 has been authenticated again.

At step 230 connection information may be determined for the client device 160. The connection information may be determined based on the service requested by the client device 160 and/or may be determined based on the interface used by the client device 160 for communicating with the gateway device 125. The connection information may comprise an address and/or port for communicating with the service via the gateway device 125. The address may be an address of the gateway device 125, such as the IP address of the gateway device 125 on the Internet 150. The port may be selected based on a pre-defined list indicating which ports correspond to which services. The pre-defined list may be defined during the deployment of the gateway device 125.

At step 235 a port binding may be created between the client device 160 and the one or more host devices 165. The gateway device 125 may store a record indicating that communications received via the port corresponding to the client device 160 are to be transcoded and then transmitted to the host device 165. The gateway device 125 may use port-to-port mapping, proxy-like port mapping, application-based mapping, or any other suitable port mapping mechanism to create the port binding.

At step 240 the port that that client device 160 has been instructed to use may be opened. Typically, for security and other reasons, the port may be closed. Communications received corresponding to a closed port may be ignored. The gateway device 125 may open the port. The gateway device 125 may be configured to restrict communications via the opened port to the address of the client device 160. Any communications received from other devices through that port may be ignored. The gateway device 125 may instruct the firewall device 175 to open the port.

At step 245 the connection information determined at step 230 may be transmitted to the client device 160. The client device 160 may then use the connection information to communicate with the requested service via the gateway device 125. The transmitted connection information may comprise an address and/or port for communicating with the requested service. The address may be an address of the gateway device 125. The port may be the port that was opened at step 240.

After the client device 160 receives the connection information, the client device 160 may begin communicating with the gateway device 125 via the port indicated in the connection information. At step 250 the gateway device 125 may transcode communications between the client device 160 and the host device 165. By transcoding the communications, the gateway device 125 may cause all communications between the client device 160 and the host device 165 to pass through the gateway device 125. The client device 160 may communicate with the host device 165 as if they are directly communicating with each other, despite the fact that all communications are being routed through and transcoded by the gateway device 125.

The gateway device may alter the addresses in any communications between the client device 160 and the host device 165, or in other words the gateway device may perform address translation on the communications. The address of the host device 165 on the private network 155 may be kept hidden from the client device 160. The address of the client device 160 on the Internet 150 may be kept hidden from the host device 165. An exemplary method of transcribing data is described in further detail below in regards to FIGS. 4A and 4B.

At step 255 the connection between the client device 160 and the host device 165 may be terminated. The gateway device 125 may delete the IP address of the client device 160, thereby preventing the client device 160 from communicating with the gateway device 125. The IP address may be deleted from a list of authorized addresses. The rights of the client device 160 to access the host device 165 via the gateway device 125 may be revoked after a predetermined amount of time or based on a lack of activity. For example the authorization of the client device 160 may be timed out if there are no communications between the client device 160 and the host device 165 for ten minutes. If the user wishes to continue accessing the service, the client device 160 may communicate with the gateway device 125 to authenticate once again.

Figure 3:
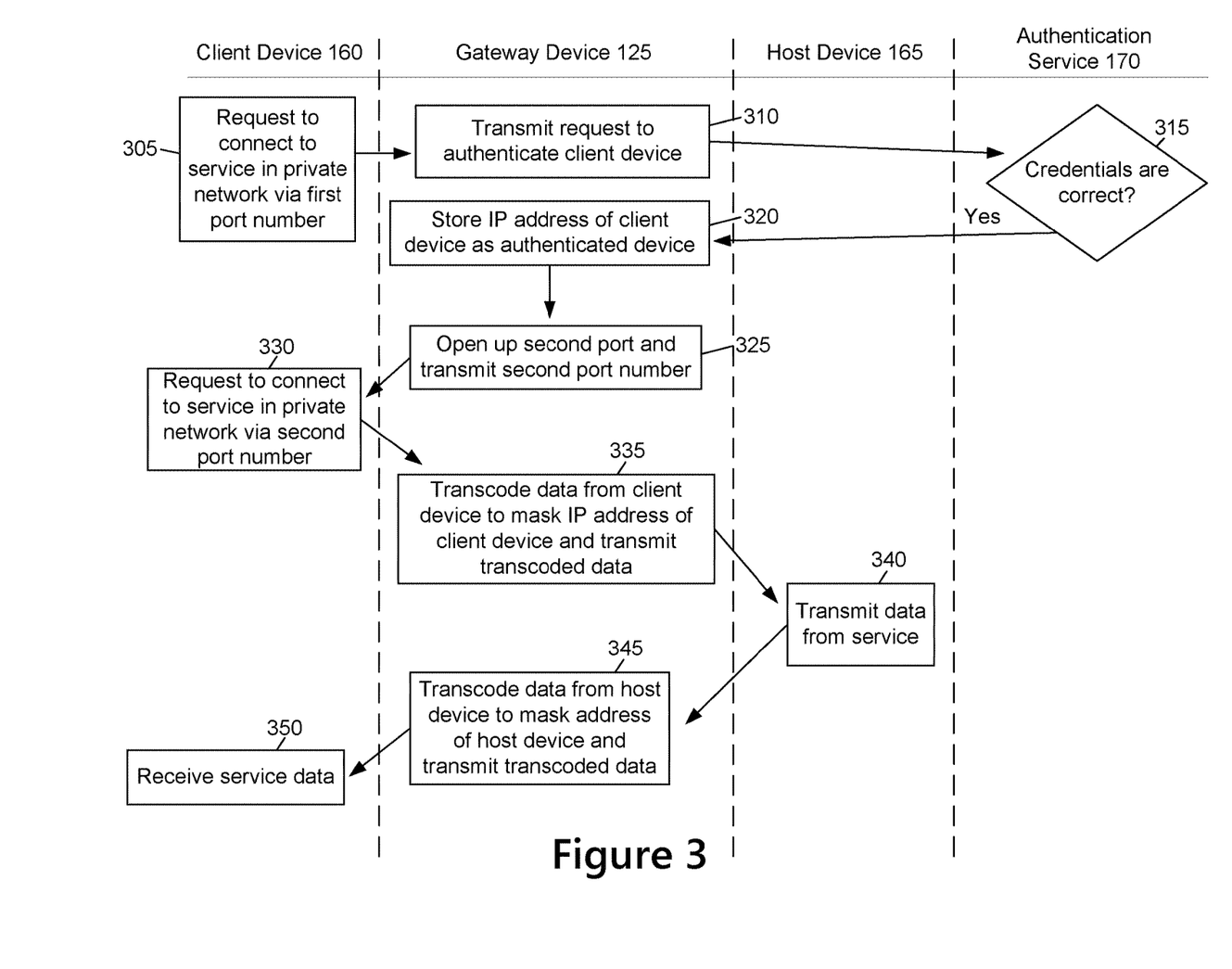
FIG. 3 shows an exemplary call flow diagram of a client accessing a service via a gateway device according to one or more illustrative aspects of the disclosure.

FIG. 3 shows an exemplary call flow diagram of a client accessing a service via a gateway device according to one or more illustrative aspects of the disclosure. Although the call flow diagram in FIG. 3 illustrates a series of events occurring in order, this diagram is simply an exemplary illustration of the steps described herein, and some steps or portions of steps in the diagram may be omitted or changed in order.

At time 305 the client device 160 may request to connect to a service. The service may be provided by the host device 165, which communicates via the private network 155. The client device 160 may transmit the request to a first port number of the gateway device 125. As described above, the request may comprise credentials for authenticating the client device 160.

At time 310 the gateway device 125 may transmit a request to authenticate the client device to the authentication service 170. At time 315 the authentication service 170 may determine whether the received credentials are valid. Although not illustrated, if the credentials are not valid the authentication service 170 may transmit, to the gateway device 125, an indication that the authentication failed. If the credentials are valid, at time 315 the authentication service 170 may transmit an indication, to the gateway device 125, that the credentials were validated and that the authentication was successful.

At time 320 the gateway device 125 may store an indication that the client device 160 has been authenticated. The gateway device 125 may store the IP address of the client device. The gateway device 125 may store a timestamp corresponding to the authentication and/or a time at which the authentication expires.

At time 325 the gateway device 125 may open a second port. The gateway device 125 may transmit the number of the second port to the client device 160. At time 330 the client device 160 may begin communicating with the service via the second port number. The client device 160 may communicate with the service through the gateway device 125.

At time 335 the gateway device 125 may receive data from the client device 160 via the second port. The data may be directed to the service at the host device 165. The gateway device 125 may decrypt the received data. The gateway device 125 may transcode the decrypted data to mask the IP address of the client device 160. The gateway device 125 may replace the IP address of the client device 160 with the address of the gateway device 125.

After transcoding the data, the gateway device 125 may encrypt the data using an encryption method used between the gateway device 125 and the host device 165. The gateway device 125 may then transmit the encrypted data to the host device 165.

At time 340 the host device 165 may transmit data from the service to the gateway device 125, such as data responsive to requests from the client device 160. At time 345 the gateway device 125 may decrypt the data. The gateway device 125 may transcode the data. The gateway device 125 may remove the address of the host device 165 on the private network 155 from the data. The gateway device 125 may replace the address of the host device 165 with the address of the gateway device 125.

After transcoding the data, the gateway device 125 may encrypt the data according to the encryption method used between the gateway device 125 and the client device 160. After encrypting the transcoded data, the gateway device 125 may transmit the encrypted data to the client device 160.

The client device 160 may receive the data from the gateway device 125 at time 350 and decrypt the data. Although the data was transmitted from the gateway device 125, the client device 160 may process the data as if it were transmitted directly from the host device 165. Although illustrated as occurring in a specific order, transmissions between the client device 160 and host device 165 may occur in any order. The client device 160 and host device 165 may transmit data to each other, via the gateway device 125, simultaneously.

Figure 4A:
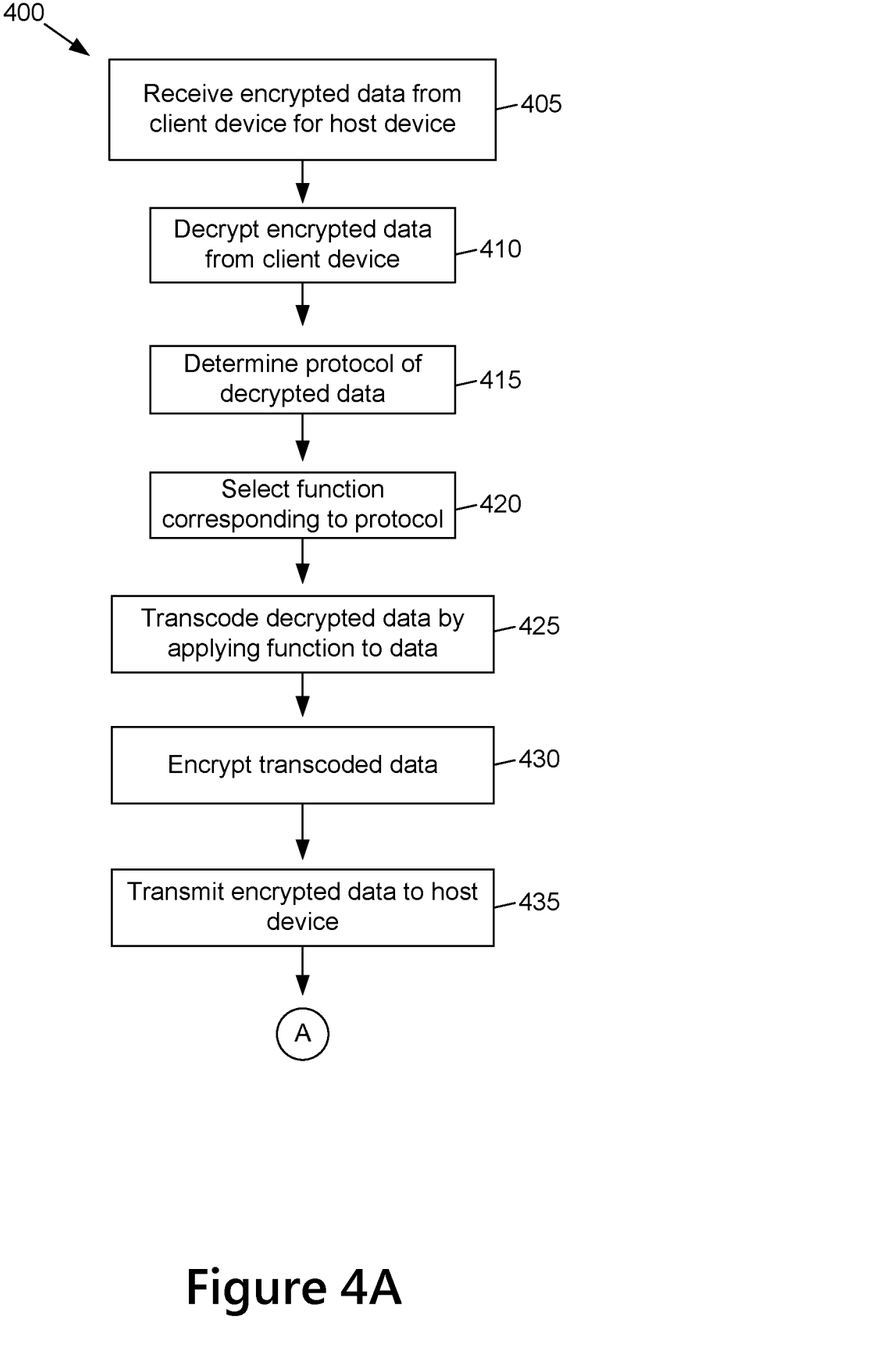
FIGS. 4A and 4B are a flow diagram of a method for transcoding data according to one or more illustrative aspects of the disclosure.
Figure 4B:
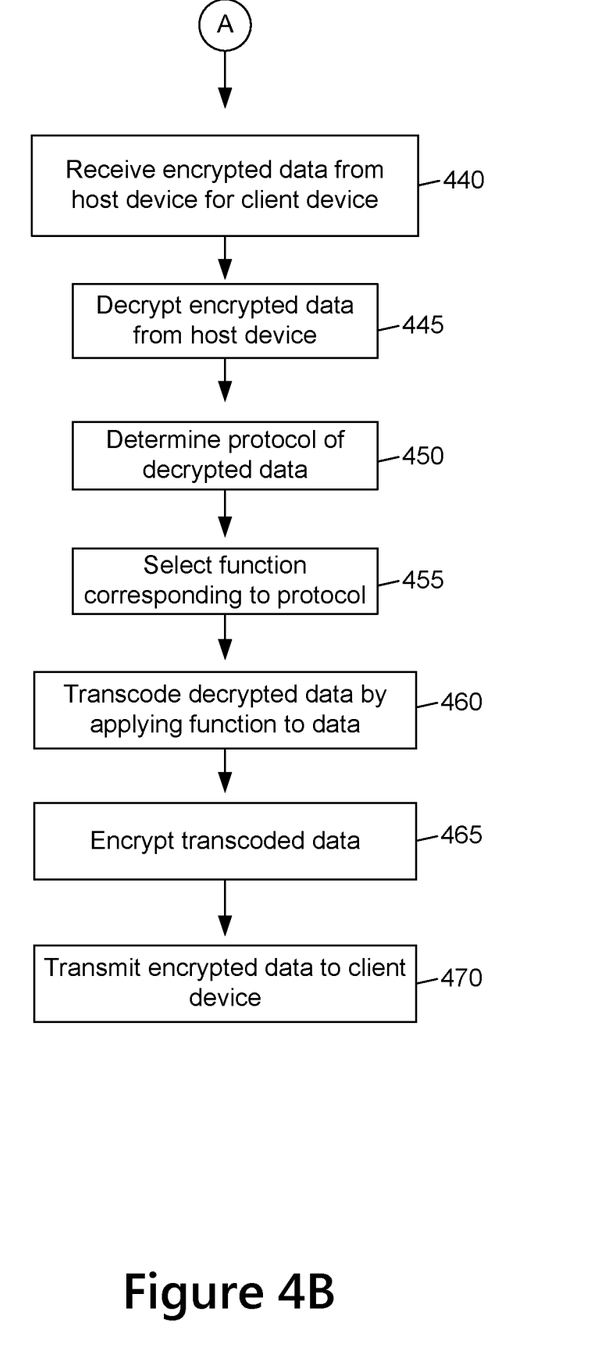

FIGS. 4A and 4B are a flow diagram of a method 400 for transcoding data according to one or more illustrative aspects of the disclosure. The method 400 or one or more steps thereof may be performed by one or more computing devices or entities, such as the computing environment 500 described below and in FIG. 5. Without limitation, all or portions of the method 400 may be executed on the computing environment 500, such as the client device 160, gateway device 125, and/or host device 165. The method 400 or one or more steps thereof may be embodied in computer-executable instructions that are stored in a computer-readable medium, such as a non-transitory computer-readable medium. Some steps or portions of steps in the flow diagram may be omitted or changed in order.

At step 405 encrypted data may be received from the client device 160. The encrypted data may be received by the gateway device 125. The encrypted data may be received via the Internet 150. The data may be intended for a service provided by the host device 165. The data may be encrypted using a public-key encryption system, or by any other encryption method. The data may be encrypted using Secure Sockets Layer (SSL) encryption, transport layer security (TLS), and/or any other suitable encryption method.

At step 410 the encrypted data may be decrypted. If public-key encryption is used, the gateway device 125 may decrypt the data using a private key. The decrypted data may be analyzed and at step 415 the protocol of the decrypted data may be determined. The gateway device 125 may determine the protocol of the decrypted data. For example the gateway device 125 may determine that the decrypted data corresponds to TLS encryption. The protocol may be determined based on a header of the decrypted data.

After determining the protocol corresponding to the received data, at step 420 a function corresponding to the protocol may be selected from a plurality of functions. The gateway device 125 may comprise or communicate with a database, such as the database 180, storing functions to be used for transcoding data. The functions may have been previously generated. Each function may indicate a specific protocol or a plurality of protocols that the function is configured for. The functions may comprise instructions describing how to transcribe data formatted according to that protocol. The functions may indicate how to find and/or replace addresses within the data. For example the functions may indicate how to replace the address of the client device 160 with the gateway device 125.

At step 420 the database 180 may be searched to determine whether there is a function corresponding to the protocol of the received data. The function determined at step 420 may be applied to the decrypted data at step 425, thereby transcoding the decrypted data. By applying the function to the decrypted data, any instances of the address of the client device 160 may be removed from the decrypted data and replaced with the address of the gateway device 125. The function may comprise instructions for other modifications to perform to the data, such as changing the domain name to SSL enabled certificates, changing the address corresponding to the host device 165, changing a thumbprint in the data, changing a username, blocking a username, and/or other modifications.

At step 430 the transcoded data may be encrypted. The data may be encrypted using a method agreed to between the gateway device 125 and the host device 165. At step 435 the encrypted data may be transmitted to the host device 165. The data may be transmitted to the host device 165 via the private network 155.

At step 440 the gateway device 125 may receive encrypted data from the host device 165. The data may be received via the private network 155. The encrypted data may be intended for the client device 160 and may be responsive to the data received by the host device at step 435. At step 445 the gateway device may decrypt the encrypted data from the host device. The data may be decrypted according to the encryption method used between the gateway device 125 and the host device 165.

At step 450 the gateway device may determine the protocol of the decrypted data. The protocol may be the same protocol that was determined at step 415 or may be a different protocol. At step 455 a function corresponding to the protocol determined at step 450 may be selected from the plurality of functions.

At step 460 the selected function may be applied to the decrypted data, thereby transcoding the data. Any occurrence of the address of the host device 165 may be removed from the data and replaced with an address of the gateway device 125. Any domain name, or any other data, that has been indicated to be data that should not be transmitted outside of the private network 155 may be changed or removed. The transcoding functions may replace the occurrence of any IP address of the private network 155 with a domain name and port corresponding to the port binding. A proxy may be used with filters to replace data within a live stream of data.

After transcoding the data, the resulting data may be encrypted at step 465 according to the encryption method used between the gateway device 125 and the client device 160. The encrypted data may be transmitted to the client device at step 470. Although FIG. 4 describes an exemplary order of steps, the client device 160 and host device 165 may transmit data back and forth to each other in any order and/or simultaneously.

Figure 5:
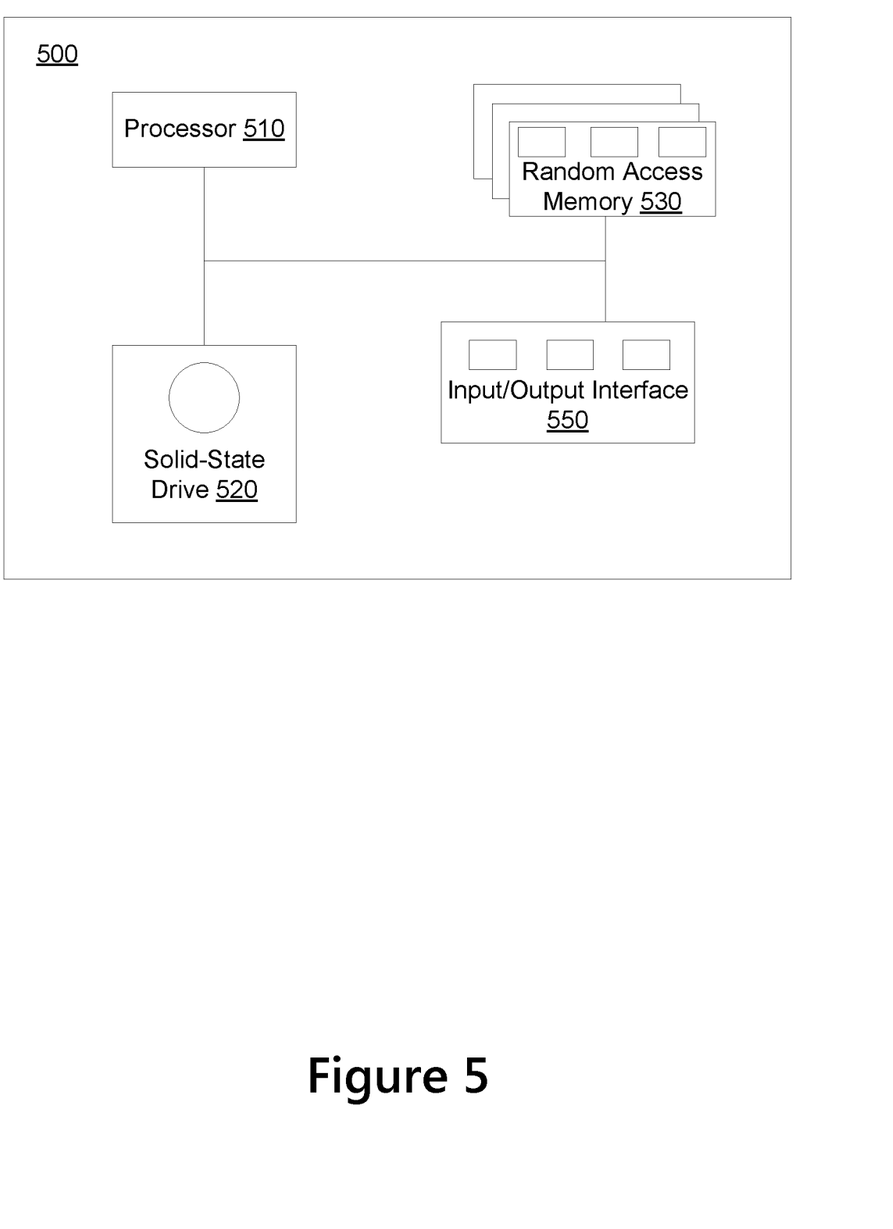
FIG. 5 shows an example computing system that may be used to implement any of the methods described herein.

FIG. 5 illustrates a diagram of a computing environment 500 in accordance with an embodiment of the present technology. In some embodiments, the computing environment 500 may be implemented by any of a conventional personal computer, a server, a router, a switch, a controller, and/or an electronic device (such as, but not limited to, a mobile device, a tablet device, a server, a controller unit, a control device, a monitoring device etc.) and/or any combination thereof appropriate to the relevant task at hand. In some embodiments, the computing environment 500 comprises various hardware components including one or more single or multi-core processors collectively represented by a processor 510, a solid-state drive 520, a memory device, for example a random access memory 530, and an input/output interface 550. The computing environment 500 may be a computer specifically designed for operating in a data center environment. The computing environment 500 may be a generic computer system.

In some embodiments, the computing environment 500 may also be a sub-system of one of the above-listed systems. In some embodiments, the computing environment 500 may be an "off the shelf" generic computer system. In some embodiments, the computing environment 500 may be distributed amongst multiple systems. The computing environment 500 may be specifically dedicated to the implementation of the present technology. As a person in the art of the present technology may appreciate, multiple variations as to how the computing environment 500 is implemented may be envisioned without departing from the scope of the present technology.

Communication between the various components of the computing environment 500 may be enabled by one or more internal and/or external buses (e.g. a PCI bus, universal serial bus, IEEE 1394 "Firewire" bus, SCSI bus, Serial-ATA bus, ARINC bus, etc.), to which the various hardware components are electronically coupled.

The input/output interface 550 may provide networking capabilities such as wired or wireless access. As an example, the input/output interface 550 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 520 stores program instructions suitable for being loaded into the random access memory 530 and executed by the processor 510. For example, the program instructions may be part of a library or an application. Although illustrated as a solid-state drive 520, any type of memory may be used in place of the solid-state drive 520, such as a hard disk, optical disk, and/or removable storage media.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method comprising:
   receiving, at a gateway device, via a public network, a request from a client device to access a service provided by a host device in a private network, wherein the gateway device is in communication with the public network and the private network;
   receiving, by the gateway device, credential information transmitted by the client device in accordance with the request to access the service provided by the host device;
   transmitting, by the gateway device, a request to authenticate the client device that includes the client device credential information to an authentication service;
   receiving, at the gateway device a transmitted indication that the client device has been authenticated by the authentication service;
   storing, by the gateway device, a record comprising:
      an address of the client device, and
      an indication that the address of the client device has been authenticated;
   querying, by the gateway device via the public network or the private network, a database to determine a first port number to open in response to the transmitted indication that the client device has been authenticated;
   creating, at the gateway device, a port binding between:
      the first port number opened to enable communications between the client device and the gateway device to transmit data for the host device service, and
      a second port number opened to enable communications between the gateway device and the host device;
   transmitting, from the gateway device to the client device, the first port number and an associated address of the gateway device for transmitting data for the host device service to the host device; and
   receiving, at the gateway device on the first port number via the public network, data to be transmitted to the host device, the data including an address of a device having sent the data;
   wherein, when the address of the device having sent the data corresponds to the address of the client device for which the first port number is opened:
      replacing, by the gateway device, the address of the client device contained in the data with an address of the gateway device on the private network to produce transcoded data, and upon the replacing of the client device address with the gateway device private network address, transmitting the transcoded data from the gateway device to the host device via the second port number;

wherein communications received at the first port number from a device other than the client device are ignored by the gateway device.

2. The method of claim 1, further comprising revoking, after a predetermined amount of time the client device's authentication.

3. The method of claim 2, wherein revoking the client device's authentication comprises removing the address of the client device from a list of authorized addresses.

4. The method of claim 1, further comprising:
receiving further data from the host device that includes an address of the host device; and
before transmitting the further data to the client device, replacing the address of the host device with an address of the gateway device on the public network.

5. The method of claim 4, wherein the address of the host device comprises a hostname.

6. The method of claim 1, wherein the requested host device service comprises a virtual network administration tool.

7. The method of claim 1, wherein the private network comprises a virtual network.

8. The method of claim 1, wherein communications between the client device and the gateway device are encrypted using secure sockets layer (SSL) encryption.

9. The method of claim 1, wherein the client device requests access to the requested host device service by communicating with the host device via a third port number.

10. The method of claim 9, wherein the request, from the client device, to authenticate with the gateway device is received via the third port number.

11. The method of claim 1, wherein the client device requests to access the requested host device service using an application program interface (API).

12. The method of claim 1, wherein the record further comprises a timestamp corresponding to the authentication of the client device.

13. The method of claim 1, wherein the associated address of the gateway device for communicating with the requested host device service comprises an address of the gateway device on the public network.

14. An apparatus comprising:
at least one processor; and
a memory device comprising executable instructions, which, when executed by the at least one processor, cause the apparatus to perform the method of claim 1.

* * * * *